Nov. 1, 1966 J. H. ANDRESEN, JR 3,282,111
DIAL INSTRUMENT
Filed April 23, 1963 4 Sheets-Sheet 1
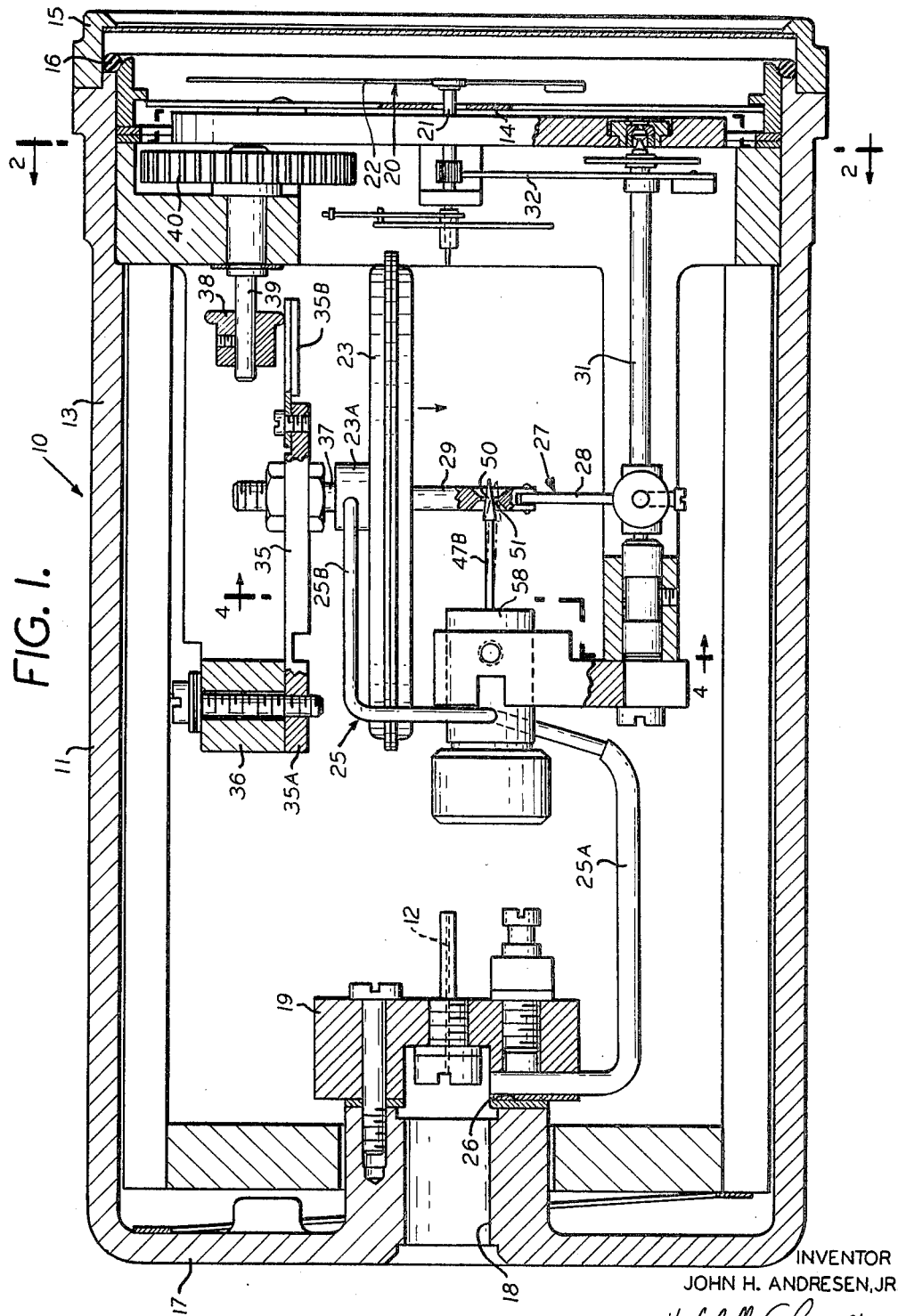
FIG. 1.
INVENTOR
JOHN H. ANDRESEN, JR.
BY 
ATTORNEYS.

Nov. 1, 1966  J. H. ANDRESEN, JR  3,282,111
DIAL INSTRUMENT
Filed April 23, 1963  4 Sheets-Sheet 2
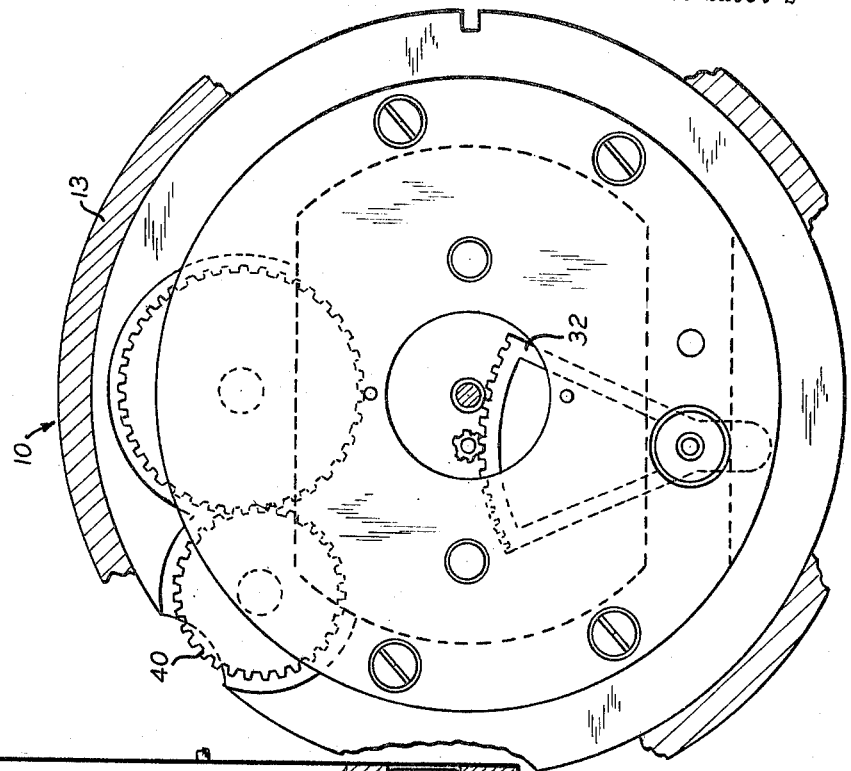
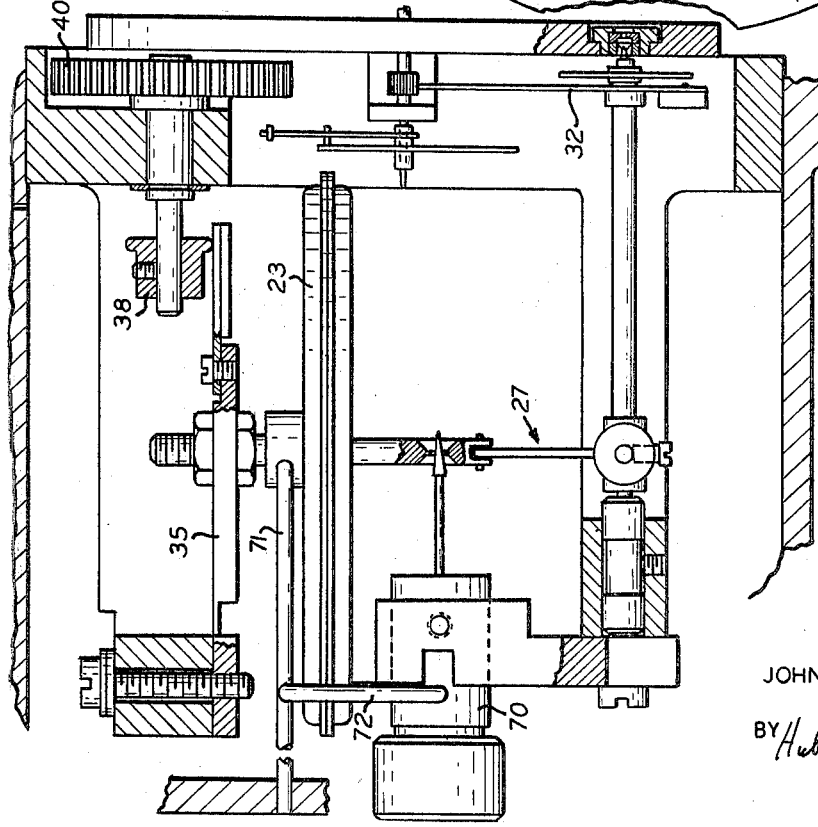
INVENTOR
JOHN H. ANDRESEN, JR.
BY Hubbell, Cohen & Steyel
ATTORNEYS.

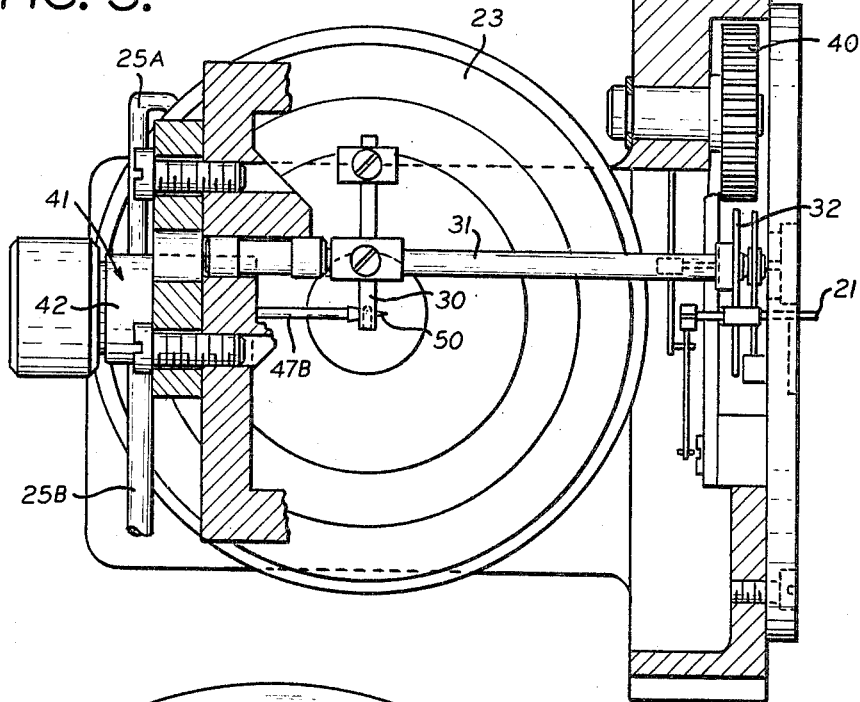
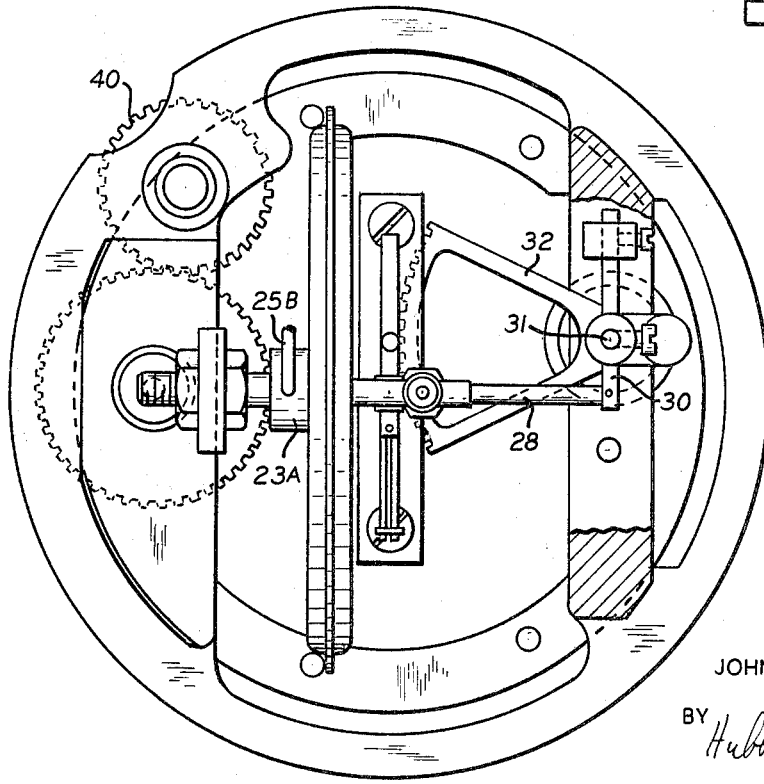
INVENTOR
JOHN H. ANDRESEN, JR.
BY Hubbell, Cohen & Stiefel
ATTORNEYS.

Nov. 1, 1966  J. H. ANDRESEN, JR  3,282,111
DIAL INSTRUMENT
Filed April 23, 1963  4 Sheets-Sheet 4
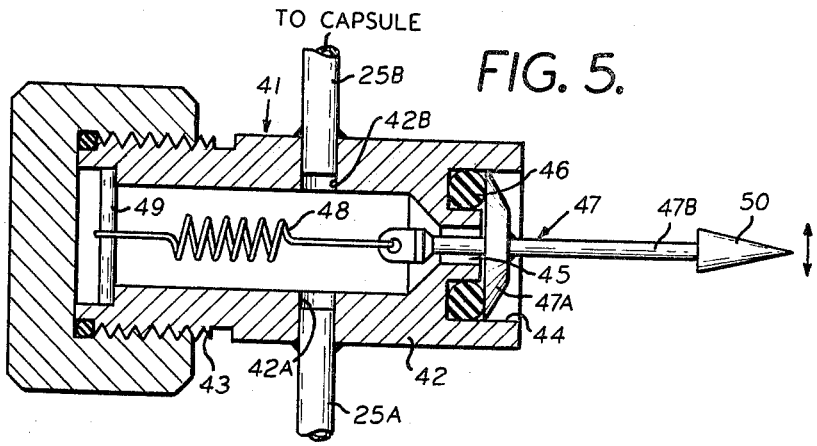
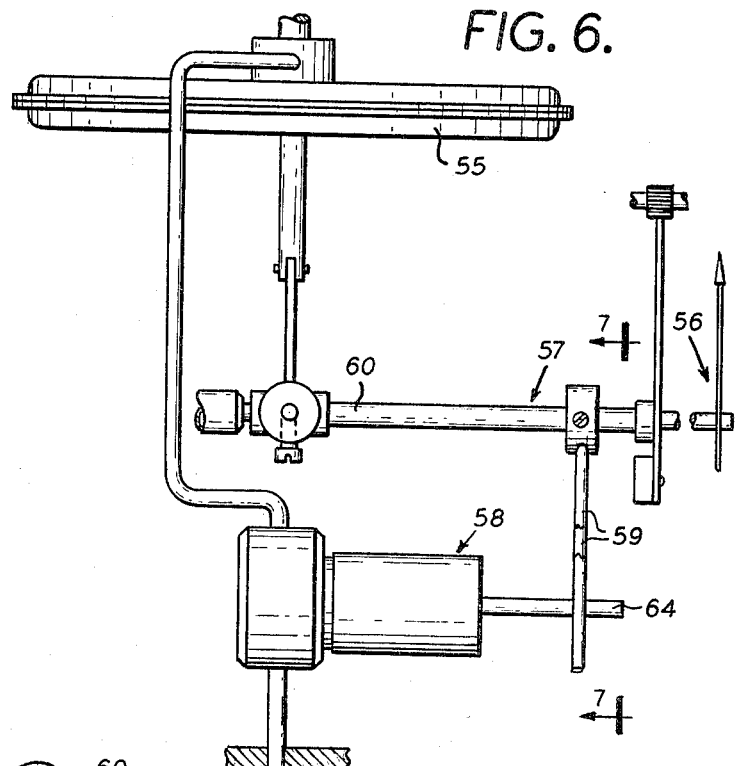
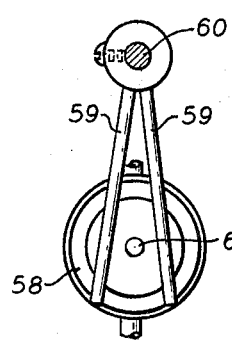
INVENTOR
JOHN H. ANDRESEN, JR.
BY Hubbell, Cohen + Stiepel
ATTORNEYS.

United States Patent Office 3,282,111
Patented Nov. 1, 1966

3,282,111
DIAL INSTRUMENT
John H. Andresen, Jr., Hewitt, N.J., assignor to Astek Instrument Corp., Armonk, N.Y., a corporation of New York
Filed Apr. 23, 1963, Ser. No. 274,972
2 Claims. (Cl. 73—410)

This invention relates in general to a dial type instrument, and more specifically to dial instruments utilizing a pressure responsive capsule as the driving means for actuating the pointer of the instrument.

In aircraft instruments, e.g. a rate of climb indicators and the like, a pressure responsive capsule, adapted to expand and contract in accordance with changes in pressure, is generally utilized as a power means for driving the pointer or indicating means of the instrument. Because of the reliance that is required to be placed on such instruments when in use, a very high degree of quality control must be exercised during their manufacture. For this reason, each instrument coming off the assembly line is subjected to vigorous tests. One of the tests that is carried out is the subjecting of each instrument to an extreme pressure test. In rate of climb indicators or the like this test is conducted by connecting the capsule to an extraneous pressure source and applying pressure to the capsule. To provide a safety factor, such pressure tests are generally conducted under conditions much more severe than that normally encountered by the instrument in actual flight.

Heretofore, when such tests have been conducted, uncontrollable line surges or excesses of pressure resulting during such test would often result in blowing or otherwise damaging the capsule unit. For this reason the capsules of many instruments were unnecessarily damaged, thereby resulting in much waste.

Therefore, an object of this invention is to provide in a capsule driven instrument means for automatically relieving the excessive damaging pressure when the capsule is subjected to a pressure test.

Another object is to provide an improved valve construction adapted for use with capsule driven instruments for automatically relieving any excess or internal build-up of pressure within the capsule means of such instrument as may occur during the testing thereof.

Still another object is to provide for relieving any excessive pressure on the capsule means of a capsule driven instrument that is relatively simple in construction, relatively inexpensive to manufacture, and positive in operation.

The foregoing objects and other features and advantages are attained in a dial instrument, e.g. a rate of climb indicator, having a pointer means, a pressure responsive means in the form of a diaphragm capsule, and a driving connection operatively connecting the capsule to the pointer means so that the latter is driven in accordance to variation in pressure which influences the expansion and contraction of the capsule. In accordance with this invention means are operatively associated with the capsule for relieving any excess pressure which is imposed on the capsule, e.g. during the pressure testing of the same. This means comprises, in essence, a valve means which is interposed between the source of pressure and the capsule. Accordingly, the valve means is connected in communication with the interior of the capsule. The valve includes an exhaust port which is normally closed by a valving member. The valving member has a valve stem that is arranged so as to be positively operated upon by the drive connection of the instrument to effect the opening of the exhaust port when the capsule has expanded or contracted beyond predetermined prescribed safe limits to thereby relieve any excessive internal pressure of the capsule.

A feature of this invention resides in a novel valve construction for exhausting the pressure responsive capsule before the occurrence of any resulting damage thereto due to excessive pressure.

Another feature resides in the provision of providing a valving member which is actuated by the drive connection of the instrument only when the capsule has expanded or contracted beyond a predetermined safe limit.

Other features and advantages will become more readily apparent when considered in view of the drawings in which:

FIG. 1 is a sectional side view of a dial instrument in accordance with this invention;
FIG. 2 is a sectional view taken along line 2—2 of FIG. 1;
FIG. 3 is a fragmentary sectional plan view of the capsule means of FIG. 1;
FIG. 4 is a sectional view taken along line 4—4 of FIG. 1;
FIG. 5 is a detail sectional side view taken through the valve relief means of this invention;
FIG. 6 is a fragmentary side view of a slightly modified arrangement;
FIG. 7 is a sectional view taken along line 7—7 of FIG. 6; and
FIG. 8 is still another modified embodiment.

Referring to the drawings, there is shown in FIG. 1 a dial instrument 10, e.g. a rate of climb indicator, embodying the instant invention. The rate of climb indicator comprises essentially a housing 11 which is hermetically sealed, except for a very small aperture 12, which has a size of approximately .02 inch, through a screw in the rear of the housing. As shown, the housing 11 comprises a tubular body portion 13 which is closed at its front end by a face dial 14 and a glass enclosure 15 therefor. An O ring gasket 16 is provided between the body sleeve 13 and the glass enclosure 15 to form a seal therebetween. The back end of the body 13 is closed by an integrally formed back wall 17 which is provided with an inlet opening 18. Capping the opening 18 is a fitting 19.

Associated with the face dial 14 is a pointer means 20. The means 20 includes a pointer shaft 21 rotatably journaled centrally of the face dial and a pointer 22 fixed thereto. Means for driving the pointer 22 for indicating a rate of climb comprises a diaphragm capsule 23 which is adapted to expand and contract in accordance to differences in pressure to which it is subjected. As shown, the interior of the diaphragm capsule 23 is connected in communication with the air pressure existing exteriorly of the housing 11 by a conduit means 25 which includes a pair of conduit segments 25A and 25B. One end of segment 25A connects with an opening 26 in the cap fitting 19 and one end of the other segment 25B of the conduit connects with the center post 23A of the capsule 23 which communicates with the interior of the capsule 23. The other ends of the respective segments connect to a valve means 58, as will be hereinafter described. It will be observed that the cross-sectional area of the conduit means 25 is greater than that of the area of the capillary 12 which connects the interior of the housing 11 in communication with the air pressure exteriorly of the housing. Because of the relative sizes of the capillary 12 and the conduit means 25 which connect the interior of the housing 11 and the interior of the capsule 23 respectively with the pressure exterior of the housing, it will be apparent that a change in pressure exterior of the housing 11 will result in a pressure differential between the pressure in the housing and the pressure within the capsule. The arrangement is such that the equalization of the pressure within the housing lags behind that of the capsule. Therefore, the amount which the capsule 23 expands and contracts is indicative of the relative pressures or pressure differential existing between the interior of the housing and the interior of the capsule which in turn is indicative of the rate of change of pressure at 18. Thus by properly proportioning the expansion of the capsule to the movement of the pointer, an indication of a rate of climb can be had.

The power resulting from expansion and contraction of the capsule 23 is transmitted to the pointer 22 by means of a drive connection or means 27. Accordingly, a diaphragm link 28 is pivotally connected to the lower center post 29 of the capsule 23. The other end of the link 28 is pivotally connected to a laterally extending arm 30 which is fixed to a drive shaft 31. Shaft 31 in turn is rotatably journaled in the housing. Thus it will be noted that vertical displacement of the center post 29 and linkage 28 connected thereto due to expansion and contraction of the capsule 23 will effect an oscillating movement of the drive shaft 31 about its axis of rotation. Fixed to the drive shaft 31 to rotate therewith is a gear sector 32. The sector 32 in turn is suitably connected by proper gearing means to the pointer shaft 21. Consequently the pointer 22 connected to the pointer shaft 21 will follow the movement of the capsule 23.

Means are provided for setting the zero rate indication of the instrument 10. Such means generally comprise a calibrating flat spring 35 which is cantileverily supported or fixed at one end 35A to a bracket 36 above the capsule 23. Intermediate the end of the spring 35 is a bearing 37 which engages the center piece 23A of the capsule 23. The free end 35B of the lever 35 engages an eccentric 38 journaled to a shaft 39 to which an adjustment wheel or gear 40 is connected, the bias for such engagement being here shown to be provided by the resiliency of the lever itself, although a separate spring bias could be employed. Thus, if zero setting is desired, rotation of the adjusting gear 40 will rotate the eccentric 38 to effect limited displacement of the lever 35 and the diaphragm capsule 23 bearing thereagainst.

In accordance with this invention, means are provided for preventing any excess buildup of pressure within the capsule 23. This means provides for automatically relieving the excessive internal pressure of the capsule 23 when it exceeds a predetermined amount. This is attained by introducing a specially constructed valve device 41 intermediate the ends of the conduit means 25.

Referring to FIG. 5 it will be seen that the valve means 41 includes a valve body or sleeve 42. Accordingly the valve body is connected between sections 25A, 25B of the conduit, i.e., segment 25A connects with a port 42A of the body 42 and the other segment 25B of conduit 25 connects with port 42B. The valve body 42 is threaded at one end 43 and counterbored at its other end 44 to define an exhaust port 45. A resilient O ring 46 circumscribes the exhaust port 45 to define a valve seal therefor. Means for valving the exhaust port 45 includes a valving member 47. As shown the valving member 47 comprises a valve head 47A and a valve stem 47B extending coaxially therethrough. The valve head 47A is normally urged into seating position on the valve seat 46 by a spring 48 which is connected between the inner end of the valve stem 47B and a pin 49 fixed to the opposite end of the valve body 42. The other end of the valve stem 47B is provided with a conical tip 50 which is arranged to extend into an enlarged opening 51 located in the lower center post 29 of the diaphragm capsule 23.

As seen in FIG. 1, it will be noted that the diaphragm capsule 23 is free to expand a predetermined amount before the periphery of the opening 51 of the center post 29 engages the conical tip 50 at the end of the valve stem 47B due to clearance between the hole and both sides of the tip. When the center post 29 is vertically displaced an excessive amount (which physically is a very small distance) the periphery of the hole or opening 51 will engage the valve stem 47B so that further displacement of the center post 29 will cause the valve stem 47B to tilt. In doing so the valve head 47A will also tilt to open the exhaust port 45, thus allowing for the excessive pressure within the capsule 23 to be vented into the housing 11, and thereby minimize the pressure differential between the pressure within and without the capsule 23. The valve spring 48, normally urging the valve head 47A closed, automatically pulls the valve head 47A into closed position onto the O ring valve seat when the pressure within the capsule has been reduced.

In pressure testing the instrument herein described, a conduit (not shown) connected to a pressure source is fitted into the opening 18 in the back wall 17. Thus when pressure is changed, the capsule 23 is immediately placed under pressure. With the specific valve means 41 disposed between the capsule 23 and the outside pressure source (not shown), it will be apparent that any rapid pressure changes will cause excessive buildup of pressure within the capsule 23. In this event the valve will be automatically relieved by the positive mechanical actuation of the drive means on the valve stem 47B when the capsule has expanded beyond a predetermined amount.

FIGS. 6 and 7 illustrate a slightly modified arrangement embodying the present invention. In the form of the invention illustrated in FIGS. 6 and 7 the respective components of the capsule 55, the pointer means 56 and the drive connection 57 are all substantially the same as the corresponding parts described hereinbefore with reference to FIG. 1. However, in the form of the invention shown in FIGS. 6 and 7 actuation of the valve means 58 instead of being directly off the capsule center post, as was true in the embodiment of FIG. 1, is taken off the rotatable drive shaft 60 (corresponding to 31 in FIG. 1) and the takeoff is by means of a fork arrangement having two members 59 that straddle the valve stem 64. If the simulated rate of climb is too great, the drive shaft 60 will rotate in one direction sufficiently far to cause one of the fingers 59 of the forked member to engage the valve stem 64 and open the valve and thereby relieve the pressure differential, and if the simulated rate of descent is too great, the drive shaft 60 will rotate in the opposite direction to cause the other fork member 59 to engage the valve stem 64 and thereby relieve the pressure differential.

The amount of rate of climb or descent necessary to actuate the valve in the embodiment shown in FIGS. 6 and 7 may be adjusted by adjusting the position of the valve with respect to the shaft 60 or by adjusting the angular relationship of the two fingers 59.

The means of adjustment available in the embodiment shown in FIGS. 6 and 7 is distinguishable from the available adjustment in the embodiment shown in FIG. 1. In the FIG. 1 embodiment adjustment of the rate of climb and descent which will be effective for actuating the valve and thereby relieving the pressure differential may be effected by adjusting the degree of penetration of the conical tip 50 in the opening 51, which adjustment can be effected by threadedly mounting the conical tip 50 on the valve stem 47B. Obviously, due to the conical shape of the tip 50 the adjustment of its longitudinal position with respect to the opening 51 will adjust the amount of vertical displacement of the center post 29 necessary to trip the valve. A similar result can be achieved by bodily moving the valve 58 with its valve stem 47B and tip 50 in order to adjust the amount of penetration of the tip 50 into the opening 51. In the alternative, a center post having a different sized opening 51 may be employed to change the simulated rate of climb which will actuate the valve 58.

FIG. 8 illustrates another embodiment of the invention. In this form the valve body 70 is connected into communication with conduit 71 by means of a branch conduit 72. In all other respects the arrangement of FIG. 8 corresponds in both structure and operation hereinbefore described with reference to FIG. 1.

While the instant invention has been disclosed with reference to several embodiments, it is to be appreciated that the invention is not to be taken as limited to all of the details thereof as modifications and variations thereof may be made without departing from the spirit or scope of the invention.

What is claimed is:
1. A dial instrument comprising:
   (a) a housing,
   (b) a pointer means mounted on said housing,
   (c) a pressure responsive capsule means mounted within said housing, said capsule means being adapted to expand and contract in response to pressure variations,
   (d) a conduit connecting the interior of said capsule to a pressure source exteriorly of said housig,
   (e) a valve means for venting said capsule means,
   (f) said valve means including a valve body connected in communication with said conduit and the interior of said capsule means,
   (g) said valve body having an exhaust port defined by a valve seat opening to the interior of said housing,
   (h) a valving member including a valve head and extending valve stem for valving said port,
   (i) a resilient spring normally biasing said valve head in seating position on said valve seat to close said port,
   (j) and a drive means operatively connecting said capsule means in driving relationship to said pointer means whereby the latter is actuated in response to the deflection of said capsule means,
   (k) said drive means including a linking means connected to said capsule means, said linkage means having an opening therein for receiving the free end of said valve stem,
   (l) said opening being larger than the diameter of said valve stem so that said capsule means and connected linkage has a limited free movement before the periphery of said opening engages the valve stem extending therethrough whereby said deflection causes said port to be opened to exhaust said capsule to relieve any excessive pressure within said capsule,
   (m) said free end of said valve stem varying in width, and means for adjusting said valve stem with respect to said opening for adjusting the pressure at which said valve is actuated.

2. A dial instrument comprising:
   (a) a housing,
   (b) a pointer means mounted on said housing,
   (c) a pressure responsive capsule means mounted within said housing, said capsule means being adapted to expand and contract in response to pressure variations,
   (d) a conduit connecting the interior of said capsule to a pressure source exteriorly of said housing,
   (e) a valve means for venting said capsule means,
   (f) said valve means including a valve body connected in communication with said conduit and the interior of said capsule means,
   (g) said valve body having an exhaust port defined by a valve seat opening to the interior of said housing,
   (h) a valving member including a valve head and extending valve stem for valving said port,
   (i) a resilient spring normally biasing said valve head in seating position on said valve seat to close said port,
   (j) and a drive means operatively connecting said capsule means in driving relationship to said pointer means whereby the latter is actuated in response to the deflection of said capsule means,
   (k) said drive means including a rotatable shaft which rotates in response to expansion and contraction of said capsule,
   (l) a pair of spaced apart fingers fixed to said rotatable shaft for rotation therewith, said fingers extending away from said shaft and straddling said valve stem in normally spaced relation therewith.

References Cited by the Examiner
UNITED STATES PATENTS

| | | | |
|---|---|---|---|
| 1,935,736 | 11/1933 | Colvin et al. | 73—179 |
| 2,031,803 | 2/1936 | Urfer | 73—179 |
| 2,309,400 | 1/1943 | Kollsman | 73—179 |
| 2,643,676 | 6/1953 | Curran | 251—78 X |
| 2,804,084 | 8/1957 | Greenland | 137—115 |
| 2,838,060 | 6/1958 | Towns | 137—115 |
| 3,014,495 | 12/1961 | Lannert et al. | 251—78 X |
| 3,040,569 | 6/1962 | Gray | 73—179 |

LOUIS R. PRINCE, *Primary Examiner.*

DONALD O. WOODIEL, *Assistant Examiner.*

UNITED STATES PATENT OFFICE
CERTIFICATE OF CORRECTION

Patent No. 3,282,111                                                   November 1, 1966

John H. Andresen, Jr.

It is hereby certified that error appears in the above numbered patent requiring correction and that the said Letters Patent should read as corrected below.

In the heading to the printed specification, lines 4 and 5, for "a corporation of New York" read -- a corporation of Delaware --.

Signed and sealed this 5th day of September 1967.

(SEAL)
Attest:

ERNEST W. SWIDER                                       EDWARD J. BRENNER
Attesting Officer                                                Commissioner of Patents